(12) United States Patent
Zhong et al.

(10) Patent No.: US 11,734,445 B2
(45) Date of Patent: Aug. 22, 2023

(54) DOCUMENT ACCESS CONTROL BASED ON DOCUMENT COMPONENT LAYOUTS

(71) Applicant: International Business Machines Corporation, Armonk, NY (US)

(72) Inventors: Peter Zhong, Vermont (AU); Antonio Jose Jimeno Yepes, Melbourne (AU); Lenin Mehedy, Doncaster East (AU)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 17/109,454

(22) Filed: Dec. 2, 2020

(65) Prior Publication Data

US 2022/0171871 A1    Jun. 2, 2022

(51) Int. Cl.
  *G06F 21/00* (2013.01)
  *G06F 21/62* (2013.01)
  *G06V 30/414* (2022.01)

(52) U.S. Cl.
  CPC ........ *G06F 21/6227* (2013.01); *G06V 30/414* (2022.01)

(58) Field of Classification Search
  None
  See application file for complete search history.

(56) References Cited

U.S. PATENT DOCUMENTS

| | | | |
|---|---|---|---|
| 5,784,487 A | 7/1998 | Cooperman | |
| 7,882,565 B2 | 2/2011 | Collins et al. | |
| 8,090,202 B2 * | 1/2012 | Konno | G06F 40/103 382/229 |
| 8,732,792 B2 * | 5/2014 | Motoyama | G06F 21/6218 726/1 |
| 8,863,301 B2 * | 10/2014 | Agrawal | G06F 21/62 726/28 |
| 8,892,579 B2 | 11/2014 | Pareek | |
| 9,003,295 B2 | 4/2015 | Baschy | |
| 9,147,080 B2 | 9/2015 | So et al. | |
| 9,171,202 B2 * | 10/2015 | Hull | G06V 30/413 |
| 9,990,474 B2 | 6/2018 | Shiraishi et al. | |
| 10,235,301 B2 | 3/2019 | LeMay et al. | |
| 10,650,156 B2 | 5/2020 | Anderson et al. | |
| 2001/0039551 A1 | 11/2001 | Saito | |

(Continued)

FOREIGN PATENT DOCUMENTS

WO    2009158108 A2    12/2009

OTHER PUBLICATIONS

"Call for Code for Racial Injustice: Can code combat systemic racism?", IBM—United States, Printed Oct. 21, 2020, 7 pages, <https://www.ibm.com/support/knowledgecenter/SSVRGU_10.0.0/basic/H_RESTRICTING_ACCESS_TO_ALL_DOCUMENTS_CREATED_FROM_A_FORM.html>.

(Continued)

*Primary Examiner* — Maung T Lwin
(74) *Attorney, Agent, or Firm* — Edward J. Wixted, III

(57) ABSTRACT

In an approach for providing a document access control based on document component layouts, a processor detects a layout of a document, the layout including one or more components of the document. A processor defines an access policy to access the one or more components based on the layout. A processor authorizes a request to access the one or more components based on the access policy and the layout. A processor retrieves the one or more components based on the access policy and the authorized request.

15 Claims, 4 Drawing Sheets

(56) References Cited

U.S. PATENT DOCUMENTS

| | | | |
|---|---|---|---|
| 2002/0184233 A1* | 12/2002 | Schneider | G06F 40/10 |
| 2004/0049574 A1* | 3/2004 | Watson | H04L 9/40 |
| | | | 709/224 |
| 2005/0165747 A1* | 7/2005 | Bargeron | G06F 16/93 |
| | | | 707/E17.022 |
| 2006/0075324 A1 | 4/2006 | Whitten | |
| 2006/0265599 A1 | 11/2006 | Kanai | |
| 2008/0294453 A1* | 11/2008 | Baird-Smith | G06F 21/10 |
| | | | 726/28 |
| 2010/0262625 A1 | 10/2010 | Pittenger | |
| 2012/0216290 A1 | 8/2012 | Roy | |
| 2012/0310868 A1 | 12/2012 | Martins | |
| 2013/0104191 A1* | 4/2013 | Peled | H04L 63/0281 |
| | | | 726/1 |
| 2013/0212707 A1* | 8/2013 | Donahue | G06F 21/6218 |
| | | | 726/29 |
| 2014/0095987 A1 | 4/2014 | Rodgers et al. | |
| 2016/0055376 A1 | 2/2016 | Koduru | |
| 2017/0147540 A1 | 5/2017 | McCormick et al. | |
| 2017/0201526 A1* | 7/2017 | Yehuda | H04L 63/102 |
| 2017/0270283 A1 | 9/2017 | Shiraishi et al. | |
| 2017/0329749 A1 | 11/2017 | Milward et al. | |
| 2019/0129968 A1 | 5/2019 | Neylan et al. | |
| 2019/0238551 A1 | 8/2019 | Gassner et al. | |
| 2020/0044843 A1 | 2/2020 | Mohammad et al. | |
| 2021/0124919 A1* | 4/2021 | Balakrishnan | G06F 21/44 |

OTHER PUBLICATIONS

Cattoni et al., "Geometric Layout Analysis Techniques for Document Image Understanding: a Review", ResearchGate, Nov. 2000, 70 pages, <https://www.researchgate.net/publication/2552084_Geometric_Layout_Analysis_Techniques_for_Document_Image_Understanding_a_Review>.

Jang et al., "Design of Access Control System for Hangul Document System", Journal of Digital Information Management, vol. 15 No. 4, Aug. 2017, 9 pages.

Rosero et al., "A Fine-Grained Document-Based Access Control Model", International Journal of Machine Learning and Computing, vol. 1, No. 3, Aug. 2011, 8 pages.

Smetters et al., "How Users Use Access Control", Proceedings of the Symposium on Usable Privacy and Security (SOUPS) 2009, Jul. 15-17, 2009, Mountain View, CA, USA, 12 pages.

Su et al. "An Action-Based Fine-Grained Access Control Mechanism for Structured Documents and Its Application", The Scientific World Journal, vol. 2014, Article ID 232708, 13 pages, <http://dx.doi.org/10.1155/2014/232708>.

Zhang et al., "Bertscore: Evaluating Text Generation With Bert", Proceedings of the Eighth International Conference on Learning Representations, Ethiopia, Africa, Apr. 26-May 1, 2020, 43 pages.

Zhong et al. "Automated Generation of Structured Training Data From Unstructured Documents", U.S. Appl. No. 16/784,726, filed Feb. 7, 2020, 54 pages.

Zhong et al., "Image-based table recognition: data, model, and evaluation", arXiv, Cornell University, eprint arXiv:1911.10683, Mar. 4, 2020, 11 pages.

Zhong et al., "PubLayNet: largest dataset ever for document layout analysis", arXiv, Cornell University, eprint arXiv:1908.07836, Aug. 16, 2019, 8 pages.

Intellectual Property Office, "Examination Report under Section 18(3)," Mar. 7, 2023, 5 pages, International Application No. GB2116546.9, Reference: DP/P49986GB.

The UK Intellectual Property Office, UK Patent Application No. 2116546.9, File Reference DDP/CTP/P49986GB, International Filing Date Nov. 17, 2021, dated Jan. 31, 2023, pp. 1-8.

* cited by examiner

```
116  {
       "layout": {
  118 ──  "components": [
     118A ── "Tables",
     118B ── "Section: Result"
         ]
       },
  302 ── "userId":"UserXXX",
  304 ── "access":"X", // "X" represent no access
  306 ── "expiry":"2021:01:10T00:00:00Z" // optional
     }
```

FIG. 3

DOCUMENT ACCESS CONTROL BASED ON DOCUMENT COMPONENT LAYOUTS

BACKGROUND

The present disclosure relates generally to the field of a document access control, and more particularly to providing a document access control based on document component layouts.

In the fields of physical security and information security, access control is the selective restriction of access to a place or other resource while access management describes the process. The act of accessing may mean consuming, entering, or using. Permission to access a resource is called authorization. Locks and login credentials may be two analogous mechanisms of access control. Document access management may allow a document administrator to control which documents a user group can view or modify. This is useful if a user would like to manage access to specific document sets and do not want to create a full break in terms of coding, messaging, and administration by creating a new project.

Existing document access control mechanism relies full encryption or sub-section encryption by a document owner to allow different level of access for different users. This requires the document owner to encrypt every document in the database appropriately for every other user, which cannot be updated dynamically to suit for a large number of users. Currently there is no option for different level of access control for different sections of the document such that an access policy can be applied dynamically to other documents in the repository with certain layouts. For example, existing techniques do not allow a user to specify that another user will have access to only tables of certain types of documents but not the text.

For example, Kanan (U.S. Patent Publication 2006/0265599) discloses an access control apparatus that controls access to a predetermined resource. The access control apparatus includes entity relationship definition information defining a predetermined relationship of a first entity attempting to access the predetermined resource with a second entity, indirect access control information defining an access right to the predetermined resource based on the predetermined relationship, and an indirect access right determining unit that detects the second entity with which the first entity has the predetermined relationship based on the entity relationship definition information, and determines an access right of the first entity based on the predetermined relationship with the detected second entity and the indirect access control information.

In another example, Neylan et al. (U.S. Patent Publication 2019/0129968) discloses a system for dynamically displaying specific sections of a file depending on a user identity is provided. The system utilizes access control data to enable an author to generate and share a file with a number of consumers and have each recipient view a customized set of sections of the file depending on access permissions associated with each recipient. The file can be in any format, e.g., a word processing document, presentation document, a media file, or any other file having a number of sections. A section of a file can be any definitive unit of data, such as a page, slide, tab, worksheet, video segment, audio segment, etc. Permissions can be based on a user's permission level, work history, skill level, role in an organization, title, etc. The system can also prevent access to certain sections of a file depending on the permissions associated with a consumer.

In yet another example, Mohammad et al. (U.S. Patent Publication 2020/0044843) discloses a method for regulating document access. The method comprises providing a set of access keys for a user, respective ones of the keys providing different user access privileges for components of a composite document, selecting multiple nodes in a distributed storage system, and distributing data representing N fragments of encrypted or unencrypted versions of the set of access keys and/or at least one of the individual keys and/or a symmetric key.

SUMMARY

Certain shortcomings of the prior art are overcome, and additional advantages are provided through the provision of an approach for real-time opportunity discovery for productivity enhancement of a production process. Advantageously, a processor detects a layout of a document, the layout including one or more components of the document. A processor defines an access policy to access the one or more components based on the layout. A processor authorizes a request to access the one or more components based on the access policy and the layout. A processor retrieves the one or more components based on the access policy and the authorized request.

In one or more embodiments, a computer-implemented method is provided to detect a layout of a document. The layout may include one or more components of the document. In an example, the components can be figures, tables, sections or other subsections of documents. The document can be received from a document repository. The document can be a digital document, for example, a scanned document or a document in other digital formats. Advantageously, the document can be analyzed using machine learning techniques. The layout can be detected using machine learning techniques. The document can be indexed based on the detected layout and components. Advantageously, in an example, the document can be in a structured format. In another example, the document can be in an unstructured format.

In one or more embodiments, a computer-implemented method is provided to define an access policy to access one or more components based on a layout. Advantageously, the computer-implemented method may provide an access to different layout components based on users and tasks. The computer-implemented method may define an access control based on the layout and the one or more components. Advantageously, the computer-implemented method may create the access policy based on the layout, the components, and a user identification. The computer-implemented method may define an access level based on the layout and the components. Advantageously, the computer-implemented method may dynamically change the access level based on the layout. For example, advantageously, the computer-implemented method may select one or more components (e.g., tables, figures, paragraphs describing table, and specific document sections) by annotating the document. The computer-implemented method may select users and specify whether a certain user can access any of components. Advantageously, the computer-implemented method may allow a user to dynamically change access level of user based on the document layout. Advantageously, the computer-implemented method may apply dynamic and granular access control to different layout components of the document to different users with varying level of access based on document layout similarities.

In one or more embodiments, a computer-implemented method is provided to authorize a request to access components of a document based on the access policy and the layout of the document. The request may be verified based on the access policy. Advantageously, the computer-implemented method may provide the access to the components based on the verified request from a user. Advantageously, the computer-implemented method may identify a certain component that the user may request to access.

In one or more embodiments, a computer-implemented method is provided to retrieve a document based on an access policy for an access request of document. Advantageously, the computer-implemented method may retrieve the allowed components of the document based on the access policy. Some certain components of the document may be made illegible based on the access control details. In another example, the contents with empty for illegible components may be removed. The computer-implemented method may encrypt illegible components for the request. The computer-implemented method may blur components enough to make some certain components illegible based on the request. The computer-implemented method may provide an access to the document with certain components and sections illegible. The computer-implemented method may extract allowed sections only. Advantageously, the computer-implemented method may be provided to display the document sections (e.g., tables, figures) based on the access level of the user by querying the index. The computer-implemented method may be provided to output the one or more components based on the verified request. The computer-implemented method may be provided to determine a layout similarity between the document and other documents, for example, documents in the document repository, based on a pre-defined similarity threshold. The computer-implemented method may be provided to dynamically apply the access policy to the other documents.

In another aspect, a computer program product is provided which includes one or more computer readable storage media, and program instructions collectively stored on the one or more computer readable storage media. Advantageously, program instructions detect a layout of a document, the layout including one or more components of the document. Program instructions define an access policy to access the one or more components based on the layout. Program instructions authorize a request to access the one or more components based on the access policy and the layout. Program instructions retrieve the one or more components based on the access policy and the authorized request.

In a further aspect, a computer system is provided which includes one or more computer processors, one or more computer readable storage media, and program instructions stored on the one or more computer readable storage media for execution by at least one of the one or more computer processors. Advantageously, program instructions detect a layout of a document, the layout including one or more components of the document. Program instructions define an access policy to access the one or more components based on the layout. Program instructions authorize a request to access the one or more components based on the access policy and the layout. Program instructions retrieve the one or more components based on the access policy and the authorized request.

Additional features and advantages are realized through the techniques of the present invention. Other embodiments and aspects of the invention are described in detail herein and are considered a part of the claimed invention.

BRIEF DESCRIPTION OF THE DRAWINGS

FIG. 3 illustrates an example access policy represented in JavaScript Object Notation (JSON) applied in the document access control module within the computing device of FIG. 1, in accordance with an embodiment of the present disclosure.

DETAILED DESCRIPTION

Figure 1:
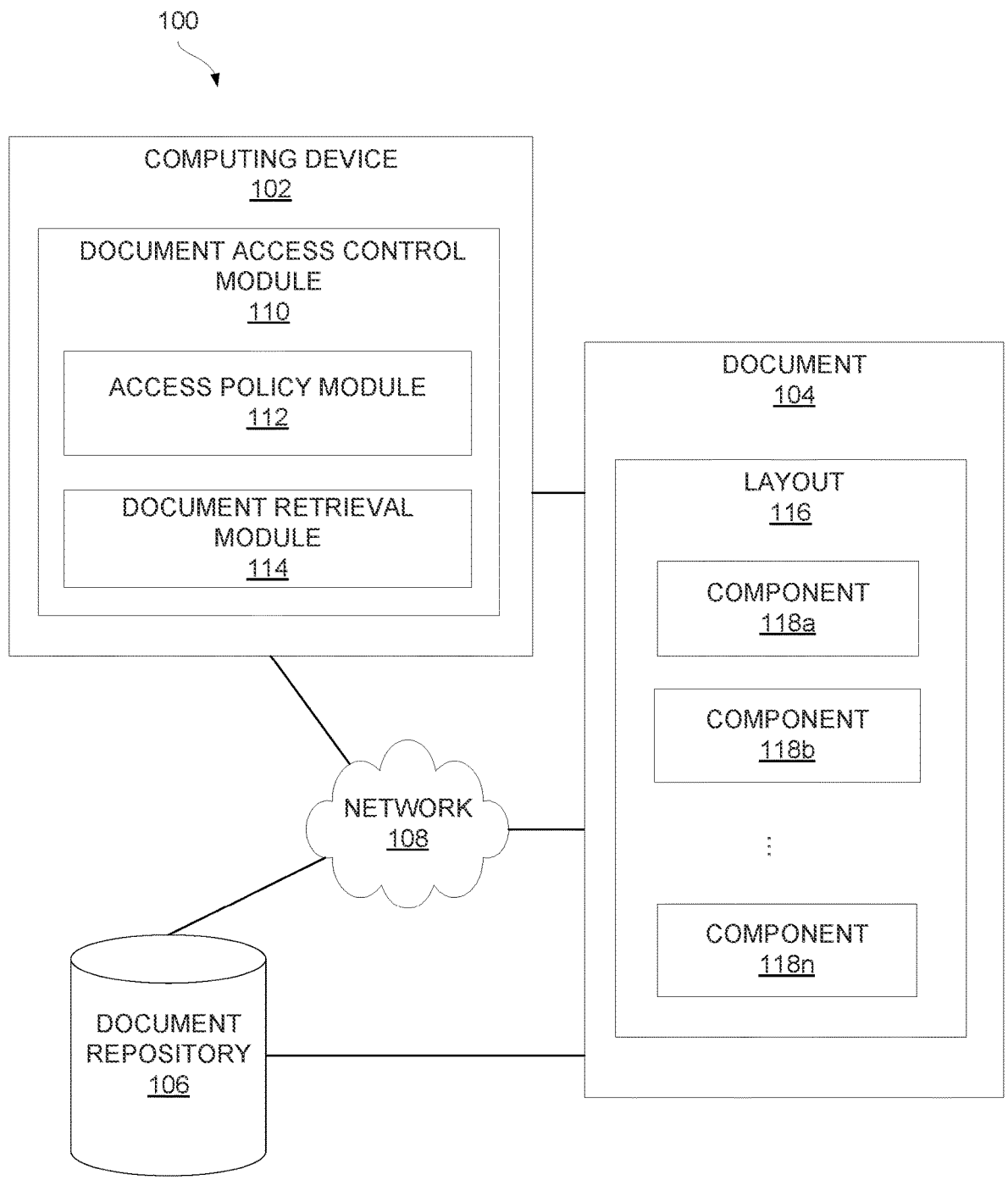
FIG. 1 is a functional block diagram illustrating a document access control environment, in accordance with an embodiment of the present disclosure.

The present disclosure is directed to systems and methods for providing a document access control based on document component layouts.

Embodiments of the present disclosure recognize a need for different level of access control for different sections of a document such that an access policy can be applied dynamically to other documents in a document repository with certain similar layouts. Embodiments of the present disclosure disclose controlling the access to specific sections of documents. Embodiments of the present disclosure disclose managing the access to sections within a document. Embodiments of the present disclosure disclose providing an access to different layout components based on users and tasks.

Embodiments of the present disclosure disclose applying dynamic and granular access control to different layout components of documents to different users, with varying level of access, based on document layout similarities. For example, embodiments of the present disclosure disclose enabling user A to give access to user B to only tables of all similar documents (e.g. publications, memo, resumes) in a database, where such access policy can be dynamically updated as required without changing the documents. Embodiments of the present disclosure disclose assigning an access across a certain type of documents (based on layouts) to different user groups dynamically without changing the documents. Embodiments of the present disclosure disclose allowing a document owner to dynamically assign access across documents based on layout identification, without doing the assignment for every document, in a very large document database with millions of documents without changing the original document. Embodiments of the present disclosure disclose allowing users to have access to only certain sections (e.g. table with monetary values) but not the entities associated with the contract/guarantee sections in a document. Embodiments of the present disclosure disclose allowing subscription of document sections (e.g. tables, figures or specific sections such as results) with subsidized costs instead of full cost of access to the article. Embodiments of the present disclosure disclose allowing a user to specify document access level based on layout and components of a document. Embodiments of the present disclosure disclose allowing a user to dynamically change access level of user based on a document layout. Embodiments of the present disclosure disclose document access control based on document component layouts. Embodiments of the present disclosure disclose applying dynamic and granular access control to different layout components of documents to different users with varying level of access based on document layout similarities. Embodiments of the present disclosure disclose specifying a document access level based on layout and components of a document. Embodiments of the present disclosure disclose dynamically defining the access control based on a user type and a task type. Embodiments of the present disclosure disclose extracting document layout components based on the access control.

The present disclosure will now be described in detail with reference to the Figures. FIG. 1 is a functional block diagram illustrating a document access control environment, generally designated 100, in accordance with an embodiment of the present disclosure.

In the depicted embodiment, document access control environment 100 includes computing device 102, document 104, document repository 106, and network 108. In the depicted embodiment, document 104 is located outside computing device 102 and document repository 106 and accessed through a communication network such as network 108. However, in other embodiments, document 104 may be stored in document repository 106. In some embodiments, document 104 may be located on computing device 102. In some embodiments, document 104 may be accessed directly from computing device 102. In the depicted embodiment, document repository 106 is located outside computing device 102 and accessed through a communication network such as network 108. However, in other embodiments, document repository 106 may be located on computing device 102. In some embodiments, document repository 106 may be accessed directly from computing device 102.

In one or more embodiments, document repository 106 may be a database that stores digital documents, for example, scanned documents and documents in other digital formats. Document repository 106 may store structured and unstructured documents. Document repository 106 may be accessed by certain users. Document 104 may be stored in document repository 106. Document 104 may be accessed and retrieved from document repository 106. Document 104 may include layout 116. Layout 116 may include one or more components 118a-n. For example, components 118a-n can be subsections of document 104. In an example, components 118a-n can be figures, tables, sections or other subsections of documents. Document 104 may be indexed based on layout 116 and components 118a-n. In an example, document 104 can be in a structured format. In another example, document 104 can be in an unstructured format.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to document access control module 110 and network 108 and is capable of processing program instructions and executing document access control module 110, in accordance with an embodiment of the present disclosure. Computing device 102 may include internal and external hardware components, as depicted and described in further detail with respect to FIG. 4.

Further, in the depicted embodiment, computing device 102 includes document access control module 110. In the depicted embodiment, document access control module 110 is located on computing device 102. However, in other embodiments, document access control module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and document access control module 110, in accordance with a desired embodiment of the disclosure.

In one or more embodiments, document access control module 110 is configured to detect layout 116 of document 104. Layout 116 may include one or more components 118a-n of document 104. For example, components 118a-n can be subsections of document 104. In an example, components 118a-n can be figures, tables, sections or other subsections of documents. Document access control module 110 may receive document 104 from document repository 106. Document repository 106 may store digital documents, for example, scanned documents or documents in other digital formats. Document 104 may be a digital document from document repository 106. Document access control module 110 may analyze document 104 using machine learning techniques. Document access control module 110 may detect layout 116 of document 104 using machine learning techniques. In an example, document access control module 110 may detect layout 116 and components 118a-n (e.g., tables) using an evaluation metric called tree edit distance similarity (TEDS), which captures performance of table structure recognition and cell content recognition. Document access control module 110 can more appropriately capture multi-hop cell misalignment and optical character recognition errors using TEDS. Document access control module 110 may examine recognition results at a global tree-structure level using TEDS. Document access control module 110 may index document 104 based on detected layout 116 and components 118a-n. In an example, document 104 can be in a structured format. In another example, document 104 can be in an unstructured format. For example, document access control module 110 may automatically create a large set of annotated documents (e.g., portable document format (PDF) documents) based on a set of unlabeled documents (e.g., PDF documents) and a corresponding set of structured documents, such as Extensible Markup Language (XML) files. Each PDF and XML document pair may represent the same general information in different formats, with the PDF being a format designed to be easily consumed by a human reader and the XML format being a structured format including labels that identify that various components 118a-n (e.g., paragraphs, images, tables, etc.) of document 104. Document access control module 110 may automatically label each annotated document such that the various components 118a-n (e.g., sentences, paragraphs, titles, images, tables, headers, footers and the like) of layout 116 can be accurately identified and labeled. The large resultant set of annotated PDF documents can then be used as training data to effectively train a machine learning model to analyze new documents and identify and extract layout elements from the new documents, e.g., document 104. Document access control module 110 may use the training data to identify and extract layout 116 and components 118a-n. Document access control module 110 may use a deep neural network to analyze layout 116 of document 104. In an example, document access control module 110 may label a large amount of documents (e.g., PDF documents) that do not initially have any delineation or labels specified by parsing the PDF and then matching unlabeled portions of the parsed PDF to labeled portions of the XML document. It should be understood that although the present disclosure generally uses PDF and XML documents as examples of unstructured and structured documents utilized by the disclosed system to automatically generate training data, it is contemplated that in various embodiments of the invention, any other suitable type of unstructured and/or structured documents can alternatively be used. For example, other types of unstructured documents can include scanned documents, and plain text (tables, lists, and simple images can be constructed by spatially arrange characters and symbols in a way that is perceivable by humans); and other types of structured documents can include mark-down, JSON, word processing documents, and Hypertext Markup Language (HTML).

In one or more embodiments, document access control module 110 is configured to define an access policy to access the one or more components 118a-n based on layout 116. Document access control module 110 may provide an access to different layout components 118a-n based on users and tasks. Document access control module 110 may define an access control based on layout 116 and one or more components 118a-n. Document access control module 110 may create the access policy based on layout 116, one or more components 118a-n, and a user identification. Document access control module 110 may define an access level based on layout 116 and one or more components 118a-n. Document access control module 110 may dynamically change the access level based on layout 116. For example, document access control module 110 may select one or more components 118a-n (e.g., tables, figures, paragraphs describing table, and specific document sections) by annotating a sample document (e.g., document 104) representing documents of a certain layout (e.g., layout 116). Document access control module 110 may select users and specify whether a certain user can access any of components 118a-n of documents with a similar layout to layout 116 in a document database (e.g., document repository 106). Document access control module 110 may have an option to set up an expiration time for accessing any of components 118a-n. Document access control module 110 may select access control based on the task at hand for a user. Document access control module 110 may identify that a user needs to access certain section (e.g., any of one or more components 118a-n) of document 104.

Document access control module 110 may define control access to only certain components 118a-n (e.g., component 118a) but not other components 118a-n (e.g., component 118n). In an example, document access control module 110 may define certain sections (e.g. table with monetary values) but not the entities associated with the contract/guarantee in an example financial document. Document access control module 110 may allow subscription of document sections (e.g. tables or figures or specific sections such as results) with subsidized costs instead of full cost of access to the article. Document access control module 110 may allow a user to specify document access level based on layout 116 and components 118a-n of document 104. Document access control module 110 may allow a user to dynamically change access level of user based on document layout 116. Document access control module 110 may apply dynamic and granular access control to different layout components 118a-n of document 104 to different users with varying level of access based on document layout similarities. In an example, document access control module 110 may determine a document layout similarity using a pre-trained language model, for example, BERT (bidirectional encoder representations from transformers) that is a neural network-based technique for natural language processing pre-training. Document access control module 110 may use an automatic evaluation metric for text generation, e.g., BERT Score. Document access control module 110 may compute a similarity score for each token in a candidate sentence with each token in the reference sentence. Document access control module 110 may compute token similarity using contextual embeddings. Document access control module 110 may correlate better with human judgments and provide stronger model selection performance. Document access control module 110 may compute the similarity of two sentences as a sum of cosine similarities between the tokens' embeddings. Document access control module 110 may dynamically define the access control based on a user type and a task type. Document access control module 110 may extract document layout components 118a-n based on the access control. Document access control module 110 may specify an access level of user by specifying layout 116 and components 118a-n of document 104 and respective users.

Document access control module 110 may provide different level of access control for different components 118a-n (e.g., different sections) of document 104 such that the access policy can be applied dynamically to other documents in document repository 106 with certain similar layouts in other documents with document 104. Document access control module 110 may apply dynamic and granular access control to different layout components of documents to different users, with varying level of access, based on document layout similarities. For example, document access control module 110 may enable user A to give access to user B to only tables of all similar documents (e.g. publications, memos, resumes) in document repository 106, where such access policy can be dynamically updated as required. Document access control module 110 may provide access control to components 118a-n (e.g., specific sections) of document 104. Document access control module 110 may provide the access management of individual sections of document 104. Document access control module 110 may manage the access control to individual sections within document 104. Document access control module 110 may manage the access control with document 104 that may be in a structured format or an unstructured format.

In one or more embodiments, document access control module 110 is configured to authorize a request to access components 118a-n based on the access policy and layout 116 of document 104. Document access control module 110 may verify the request based on the access policy. Document access control module 110 may provide the access to one or more components 118a-n based on the verified request from a user. Document access control module 110 may identify a certain component (e.g., any of components 118a-n) that the user may request to access.

In one or more embodiments, document access control module 110 is configured to retrieve document 104 based on the access policy for an access request of document 104. Document access control module 110 may retrieve the allowed components 118a-n of document 104 based on the access policy. Document access control module 110 may make sections (e.g., some certain components 118a-n) of document 104 illegible based on the access control details. In another example, document access control module 110 may remove the contents with empty for illegible components. Document access control module 110 may encrypt illegible components for the request. Document access control module 110 may blur components enough to make some certain components illegible based on the request. Document access control module 110 may provide an access to document 104 with certain components and sections illegible. Document access control module 110 may extract allowed sections only. Document access control module 110 may display the document sections (e.g., tables, figures) based on the access level of the user by querying the index. Document access control module 110 may output one or more components 118a-n based on the verified request. Document access control module 110 may display components 118a-n based on an access level. Document access control module 110 may determine a layout similarity between document 104 and other documents, for example, documents in document repository 106, based on a predefined similarity threshold. In an example, document access control module 110 may determine the document layout similarity using a pre-trained language model, for example, BERT that is a neural network-based technique for natural language processing pre-training. Document access control module 110 may use an automatic evaluation metric for text generation, e.g., BERT Score. Document access control module 110 may compute a similarity score for each token in a candidate sentence with each token in the reference sentence. Document access control module 110 may compute token similarity using contextual embeddings. Document access control module 110 may correlate better with human judgments and provide stronger model selection performance. Document access control module 110 may compute the similarity of two sentences as a sum of cosine similarities between the tokens' embeddings. Document access control module 110 may dynamically apply the access policy to the other documents. Document access control module 110 may retrieve a component of other documents based on the access policy for document 104 with a similar layout.

In the depicted embodiment, document access control module 110 includes access policy module 112 and document retrieval module 114. In one or more embodiments, access policy module 112 is configured to define an access policy to access the one or more components 118a-n based on layout 116. Access policy module 112 may provide an access to different layout components 118a-n based on users and tasks. Access policy module 112 may define an access control based on layout 116 and one or more components 118a-n. Access policy module 112 may create the access policy based on layout 116, one or more components 118a-n, and a user identification. Access policy module 112 may define an access level based on layout 116 and one or more components 118a-n. Access policy module 112 may dynamically change the access level based on layout 116. For example, access policy module 112 may select one or more components 118a-n (e.g., tables, figures, paragraphs describing table, and specific document sections) by annotating document 104. Access policy module 112 may select users and specify whether a certain user can access any of components 118a-n. Access policy module 112 may have an option to set up an expiration time for accessing any of components 118a-n. Access policy module 112 may select access control based on the task at hand for a user. Access policy module 112 may identify that a user needs to access certain section (e.g., any of one or more components 118a-n) of document 104.

Access policy module 112 may define control access to only certain components 118a-n (e.g., component 118a) but not other components 118a-n (e.g., component 118n). In an example, access policy module 112 may define certain sections (e.g. table with monetary values) but not the entities associated with the contract/guarantee in an example financial document. Access policy module 112 may allow subscription of document sections (e.g. tables or figures or specific sections such as results) with subsidized costs instead of full cost of access to the article. Access policy module 112 may allow a user to specify document access level based on layout 116 and components 118a-n of document 104. Access policy module 112 may allow a user to dynamically change access level of user based on document layout 116. Access policy module 112 may apply dynamic and granular access control to different layout components 118a-n of document 104 to different users with varying level of access based on document layout similarities. Access policy module 112 may dynamically define the access control based on a user type and a task type. Access policy module 112 may extract document layout components 118a-n based on the access control. Access policy module 112 may specify an access level of user by specifying layout 116 and components 118a-n of document 104 and respective users. Access policy module 112 may provide different level of access control for different components 118a-n (e.g., different sections) of document 104 such that the access policy can be applied dynamically to other documents in document repository 106 with certain similar layouts in other documents with document 104. Access policy module 112 may apply dynamic and granular access control to different layout components of documents to different users, with varying level of access, based on document layout similarities. For example, access policy module 112 may enable user A to give access to user B to only tables of all similar documents (e.g. publications, memos, resumes) in document repository 106, where such access policy can be dynamically updated as required. Access policy module 112 may provide access control to components 118a-n (e.g., specific sections) of document 104. Access policy module 112 may provide the access management of individual sections of document 104. Access policy module 112 may manage the access control to individual sections within document 104. Access policy module 112 may manage the access control with document 104 that may be in a structured format or an unstructured format.

In one or more embodiments, document retrieval module 114 is configured to retrieve document 104 based on the access policy for an access request of document 104. Document retrieval module 114 may retrieve the allowed components 118a-n of document 104 based on the access policy. Document retrieval module 114 may make sections (e.g., some certain components 118a-n) of document 104 illegible based on the access control details. In another example, document retrieval module 114 may remove the contents with empty for illegible components. Document retrieval module 114 may encrypt illegible components for the request. Document retrieval module 114 may blur components enough to make some certain components illegible based on the request. Document retrieval module 114 may provide an access to document 104 with certain components and sections illegible. Document retrieval module 114 may extract allowed sections only. Document retrieval module 114 may display the document sections (e.g., tables, figures)

based on the access level of the user by querying the index. Document retrieval module 114 may output one or more components 118*a-n* based on the verified request. Document retrieval module 114 may display components 118*a-n* based on an access level. Document retrieval module 114 may determine a layout similarity between document 104 and other documents, for example, documents in document repository 106, based on a pre-defined similarity threshold. Document retrieval module 114 may dynamically apply the access policy to the other documents. Document retrieval module 114 may retrieve a component of other documents based on the access policy for document 104 with a similar layout.

Figure 2:
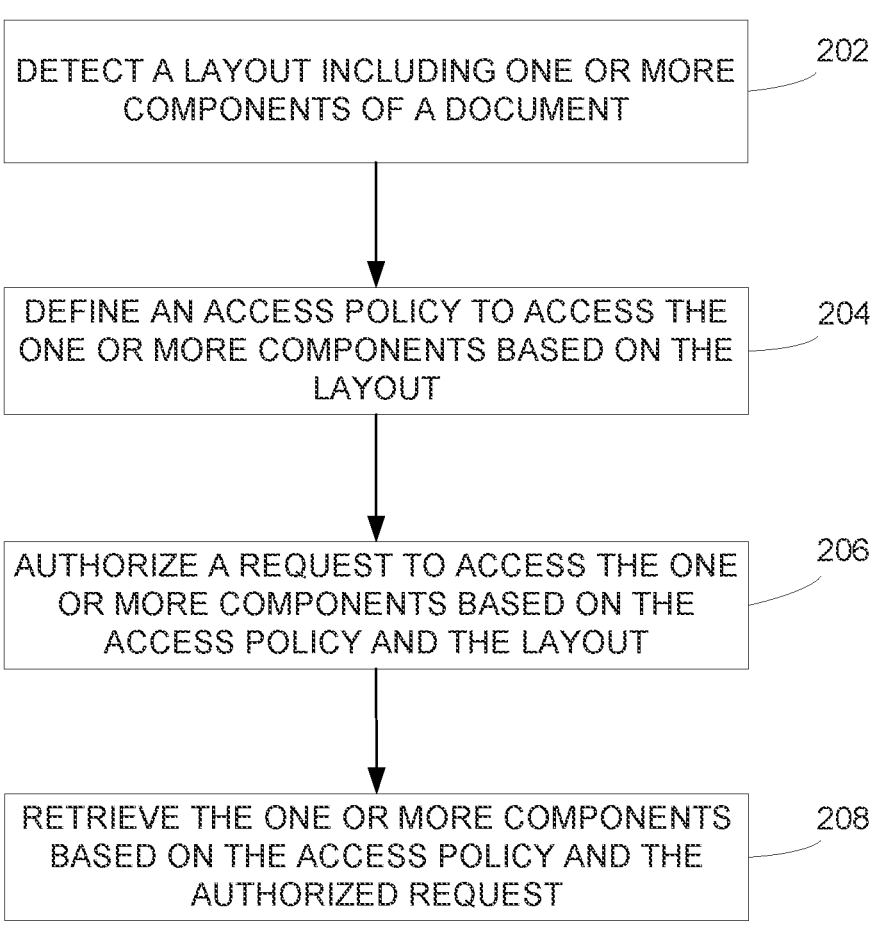
FIG. 2 is a flowchart depicting operational steps of a document access control module 110 within a computing device of FIG. 1, in accordance with an embodiment of the present disclosure.

FIG. 2 is a flowchart 200 depicting operational steps of document access control module 110 in accordance with an embodiment of the present disclosure.

Document access control module 110 operates to detect layout 116 of document 104. Layout 116 may include one or more components 118*a-n* of document 104. Document access control module 110 also operates to define an access policy to access one or more components 118*a-n* based on layout 116. Document access control module 110 operates to authorize a request to access components 118*a-n* based on the access policy and layout 116 of document 104. Document access control module 110 operates to retrieve document 104 based on the access policy of document 104 for a request from a user.

In step 202, document access control module 110 detects layout 116 of document 104. Layout 116 may include one or more components 118*a-n* of document 104. For example, components 118*a-n* can be subsections of document 104. In an example, components 118*a-n* can be figures, tables, sections or other subsections of documents. Document access control module 110 may receive document 104 from document repository 106. Document repository 106 may store digital documents, for example, scanned documents or documents in other digital formats. Document 104 may a digital document from document repository 106. Document access control module 110 may analyze document 104 using machine learning techniques. Document access control module 110 may detect layout 116 of document 104 using machine learning techniques. In an example, document access control module 110 may detect layout 116 and components 118*a-n* (e.g., tables) using an evaluation metric TEDS, which captures performance of table structure recognition and cell content recognition. Document access control module 110 can more appropriately capture multi-hop cell misalignment and optical character recognition errors using TEDS. Document access control module 110 may examine recognition results at a global tree-structure level using TEDS. Document access control module 110 may index document 104 based on detected layout 116 and components 118*a-n*. In an example, document 104 can be in a structured format. In another example, document 104 can be in an unstructured format. For example, document access control module 110 may automatically create a large set of annotated documents (e.g., PDF documents) based on a set of unlabeled documents (e.g., PDF documents) and a corresponding set of structured documents, such as XML files. Each PDF and XML document pair may represent the same general information in different formats, with the PDF being a format designed to be easily consumed by a human reader and the XML format being a structured format including labels that identify that various components 118*a-n* (e.g., paragraphs, images, tables, etc.) of document 104. Document access control module 110 may automatically label each annotated document such that the various components 118*a-n* (e.g., sentences, paragraphs, titles, images, tables, headers, footers and the like) of layout 116 can be accurately identified and labeled. The large resultant set of annotated PDF documents can then be used as training data to effectively train a machine learning model to analyze new documents and identify and extract layout elements from the new documents, e.g., document 104. Document access control module 110 may use the training data to identify and extract layout 116 and components 118*a-n*. Document access control module 110 may use a deep neural network to analyze layout 116 of document 104. In an example, document access control module 110 may label a large amount of documents (e.g., PDF documents) that do not initially have any delineation or labels specified by parsing the PDF and then matching unlabeled portions of the parsed PDF to labeled portions of the XML document. It should be understood that although the present disclosure generally uses PDF and XML documents as examples of unstructured and structured documents utilized by the disclosed system to automatically generate training data, it is contemplated that in various embodiments of the invention, any other suitable type of unstructured and/or structured documents can alternatively be used. For example, other types of unstructured documents can include scanned documents, and plain text (tables, lists, and simple images can be constructed by spatially arrange characters and symbols in a way that is perceivable by humans); and other types of structured documents can include mark-down, JSON, word processing documents, and HTML.

In step 204, document access control module 110 defines an access policy to access one or more components 118*a-n* based on layout 116. Document access control module 110 may provide an access to different layout components 118*a-n* based on users and tasks. Document access control module 110 may define an access control based on layout 116 and one or more components 118*a-n*. Document access control module 110 may create the access policy based on layout 116, one or more components 118*a-n*, and a user identification. Document access control module 110 may define an access level based on layout 116 and one or more components 118*a-n*. Document access control module 110 may dynamically change the access level based on layout 116. For example, document access control module 110 may select one or more components 118*a-n* (e.g., tables, figures, paragraphs describing table, and specific document sections) by annotating a sample document (e.g., document 104) representing documents of a certain layout (e.g., layout 116). Document access control module 110 may select users and specify whether a certain user can access any of components 118*a-n* of documents with a similar layout to layout 116 in a document database (e.g., document repository 106). Document access control module 110 may have an option to set up an expiration time for accessing any of components 118*a-n*. Document access control module 110 may select access control based on the task at hand for a user. Document access control module 110 may identify that a user needs to access certain section (e.g., any of one or more components 118*a-n*) of document 104.

Document access control module 110 may define control access to only certain components 118*a-n* (e.g., component 118*a*) but not other components 118*a-n* (e.g., component 118*n*). In an example, document access control module 110 may define certain sections (e.g. table with monetary values) but not the entities associated with the contract/guarantee in an example financial document. Document access control module 110 may allow subscription of document sections (e.g. tables or figures or specific sections such as results)

with subsidized costs instead of full cost of access to the article. Document access control module 110 may allow a user to specify document access level based on layout 116 and components 118a-n of document 104. Document access control module 110 may allow a user to dynamically change access level of user based on document layout 116. Document access control module 110 may apply dynamic and granular access control to different layout components 118a-n of document 104 to different users with varying level of access based on document layout similarities. In an example, document access control module 110 may determine a document layout similarity using a pre-trained language model, for example, BERT that is a neural network-based technique for natural language processing pre-training. Document access control module 110 may use an automatic evaluation metric for text generation, e.g., BERT Score. Document access control module 110 may compute a similarity score for each token in a candidate sentence with each token in the reference sentence. Document access control module 110 may compute token similarity using contextual embeddings. Document access control module 110 may correlate better with human judgments and provide stronger model selection performance. Document access control module 110 may compute the similarity of two sentences as a sum of cosine similarities between the tokens' embeddings. Document access control module 110 may dynamically define the access control based on a user type and a task type. Document access control module 110 may extract document layout components 118a-n based on the access control. Document access control module 110 may specify an access level of user by specifying layout 116 and components 118a-n of document 104 and respective users.

Document access control module 110 may provide different level of access control for different components 118a-n (e.g., different sections) of document 104 such that the access policy can be applied dynamically to other documents in document repository 106 with certain similar layouts in other documents with document 104. Document access control module 110 may apply dynamic and granular access control to different layout components of documents to different users, with varying level of access, based on document layout similarities. For example, document access control module 110 may enable user A to give access to user B to only tables of all similar documents (e.g. publications, memos, resumes) in document repository 106, where such access policy can be dynamically updated as required. Document access control module 110 may provide access control to components 118a-n (e.g., specific sections) of document 104. Document access control module 110 may provide the access management of individual sections of document 104. Document access control module 110 may manage the access control to individual sections within document 104. Document access control module 110 may manage the access control with document 104 that may be in a structured format or an unstructured format.

In step 206, document access control module 110 authorizes a request to access components 118a-n based on the access policy and layout 116 of document 104. Document access control module 110 may verify the request based on the access policy. Document access control module 110 may provide the access to one or more components 118a-n based on the verified request from a user. Document access control module 110 may identify a certain component (e.g., any of components 118a-n) that the user may request to access.

In step 208, document access control module 110 retrieves document 104 based on the access policy of document 104 for a request from a user. Document access control module 110 may retrieve the allowed components 118a-n of document 104 based on the access policy for the request. Document access control module 110 may make sections (e.g., some certain components 118a-n) of document 104 illegible based on the access control details. In another example, document access control module 110 may remove the contents with empty for illegible components. Document access control module 110 may encrypt illegible components for the request. Document access control module 110 may blur components enough to make some certain components illegible based on the request. Document access control module 110 may provide an access to document 104 with certain components and sections illegible. Document access control module 110 may extract allowed sections only. Document access control module 110 may display the document sections (e.g., tables, figures) based on the access level of the user by querying the index. Document access control module 110 may output one or more components 118a-n based on the verified request. Document access control module 110 may display components 118a-n based on an access level. Document access control module 110 may determine a layout similarity between document 104 and other documents, for example, documents in document repository 106, based on a pre-defined similarity threshold. In an example, document access control module 110 may determine the document layout similarity using a pre-trained language model, for example, BERT that is a neural network-based technique for natural language processing pre-training. Document access control module 110 may use an automatic evaluation metric for text generation, e.g., BERT Score. Document access control module 110 may compute a similarity score for each token in a candidate sentence with each token in the reference sentence. Document access control module 110 may compute token similarity using contextual embeddings. Document access control module 110 may correlate better with human judgments and provide stronger model selection performance. Document access control module 110 may compute the similarity of two sentences as a sum of cosine similarities between the tokens' embeddings. Document access control module 110 may dynamically apply the access policy to the other documents. Document access control module 110 may retrieve a component of other documents based on the access policy for document 104 with a similar layout.

FIG. 3 illustrates an example access policy represented in JSON applied in document access control module 110, in accordance with an embodiment of the present disclosure.

In the example of FIG. 3, document access control module 110 defines an access policy in JSON based on layout 116, components 118, and user identification 302. In other embodiments, document access control module 110 may define an access policy in other suitable file or programming formats. In the example, components 118 are defined to include, e.g., tables 118a and section 118b. Document access control module 110 defines the access policy to include control access 304. In the example, control access 304 is set as "X" which represents no access. Document access control module 110 may define an option of expiry time 306.

Figure 4:
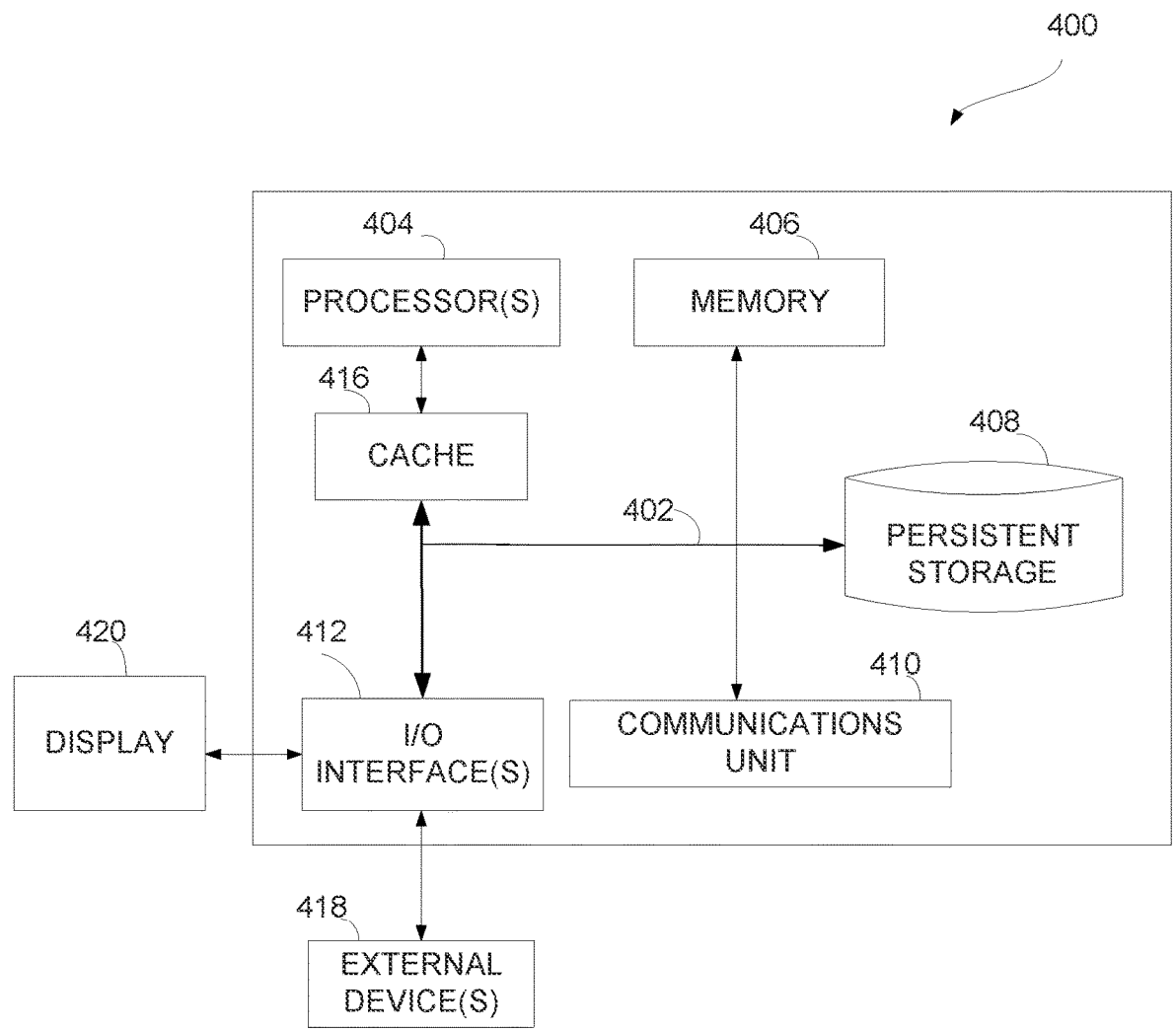
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Document access control module 110 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Document access control module 110 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., document access control module 110 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   determining, by one or more processors, a first layout of a first document, wherein the first layout comprises one or more components of the first document;
   defining an access policy granting a user access to a type of component of the one or more components, wherein the access policy is dynamically applicable to documents that have layouts matching within a pre-defined layout similarity threshold;
   determining a second document has a second layout that matches the first layout, within the pre-defined layout similarity threshold;
   receiving a request from the user to access the second document; and
   responsive to receiving the request, granting the user access to a component in the second document based on the access policy and the second layout, wherein the component is of the type of component.

2. The computer-implemented method of claim 1, wherein defining the access policy comprises defining an access level.

3. The computer-implemented method of claim 2, further comprising:
   dynamically changing, by one or more processors, the access level for the first document and the second document.

4. The computer-implemented method of claim 2, further comprising:
   presenting the component in the second document to the user.

5. The computer-implemented method of claim 1, wherein the one or more components are selected from the group consisting of: tables, figures, and sections.

6. The computer-implemented method of claim 1, wherein the access policy is stored external to the first document and the second document.

7. A computer program product comprising:
   one or more computer readable storage media collectively storing program instructions thereon to perform steps of:
   determine a first layout of a first document, wherein the first layout comprises one or more components of the first document;
   define an access policy granting a user access to a type of component of the one or more components, wherein the access policy is dynamically applicable to documents that have layouts matching within a pre-defined layout similarity threshold;

determine a second document has a second layout that matches the first layout, within the pre-defined layout similarity threshold;

receive a request from the user to access the second document; and responsive to receiving the request, grant the user access to a component in the second document based on the access policy and the second layout, wherein the component is of the type of component.

8. The computer program product of claim 7, wherein the step of defining the access policy comprises defining an access level.

9. The computer program product of claim 8, further comprising:

program instructions, stored on the one or more computer-readable storage media, to perform the step of dynamically changing the access level for the first document and the second document.

10. The computer program product of claim 8, further comprising:

program instructions, stored on the one or more computer-readable storage media, to perform the step of presenting the component in the second document to the user.

11. The computer program product of claim 7, wherein the one or more components are selected from the group consisting of: tables, figures, and sections.

12. A computer system comprising:

one or more computer processors, one or more computer readable storage media, and program instructions stored thereon, for execution by at least one of the one or more computer processors, to perform the steps of:

determine a first layout of a first document, wherein the first layout comprises one or more components of the first document;

define an access policy granting a user access to a type of component of the one or more components, wherein the access policy is dynamically applicable to documents that have layouts matching within a pre-defined layout similarity threshold;

determine a second document has a second layout that matches the first layout, within the pre-defined layout similarity threshold;

receive a request from the user to access the second document; and responsive to receiving the request, grant the user access to a component in the second document based on the access policy and the second layout, wherein the component is of the type of component.

13. The computer system of claim 12, wherein the step of defining the access policy comprises defining an access level.

14. The computer system of claim 13, further comprising:

program instructions, stored on the one or more computer-readable storage media, for execution by at least one of the one or more computer processors, to perform the step of dynamically changing the access level for the first document and the second document.

15. The computer system of claim 13, further comprising:

program instructions, stored on the one or more computer-readable storage media, for execution by at least one of the one or more computer processors, to perform the step of presenting the component in the second document to the user.

* * * * *